July 5, 1955 W. D. POUCHOT 2,712,221
GAS TURBINE AFTERBURNER APPARATUS
Filed April 22, 1952
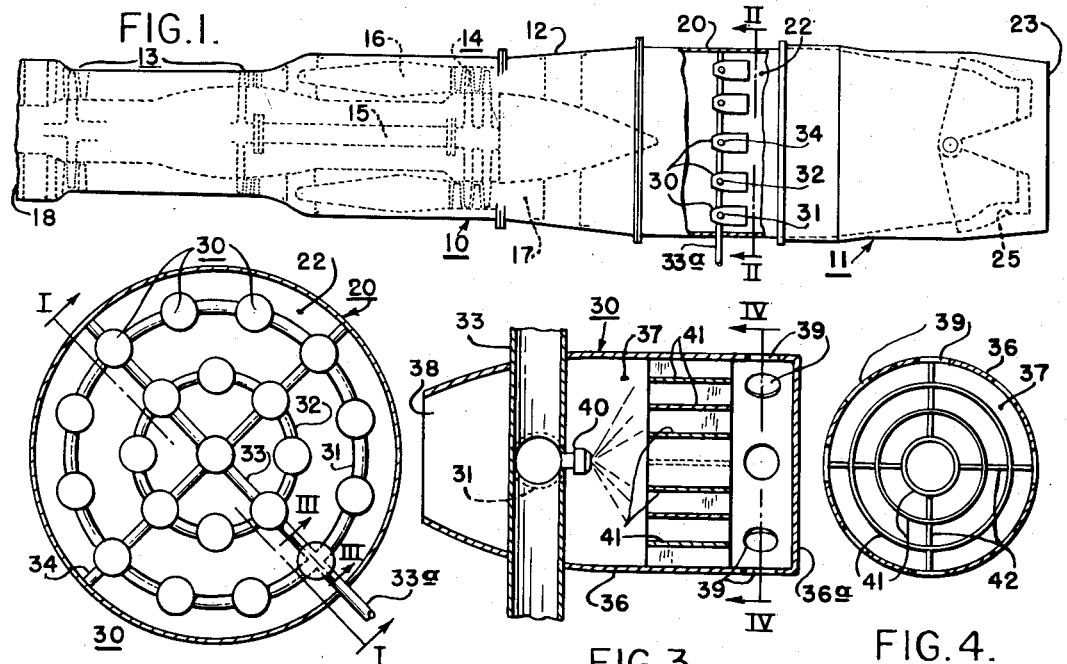
FIG.1.
FIG.2.
FIG.3.
FIG.4.
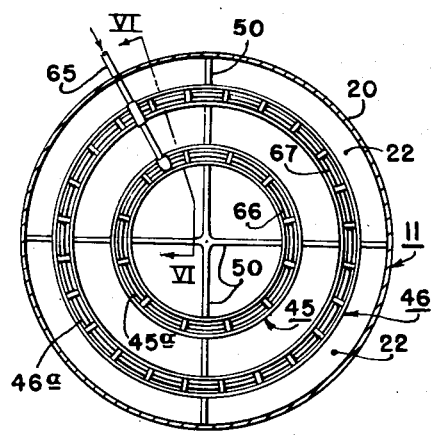
FIG.5
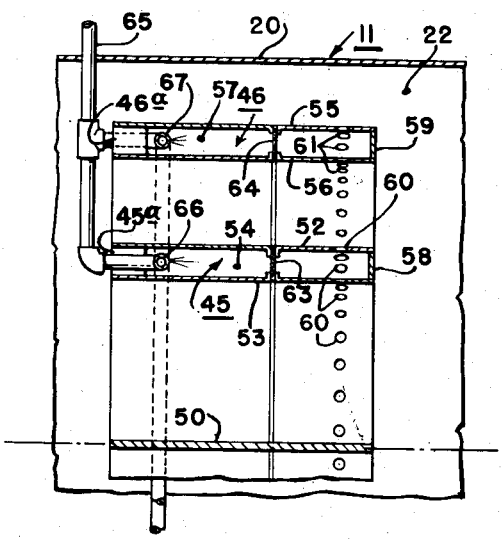
FIG.6.
WITNESSES:
INVENTOR
WALTER D. POUCHOT
BY
ATTORNEY

United States Patent Office 2,712,221
Patented July 5, 1955

2,712,221

GAS TURBINE AFTERBURNER APPARATUS

Walter D. Pouchot, Prospect Park, Pa., assignor to Westinghouse Electric Corporation, East Pittsburgh, Pa., a corporation of Pennsylvania Application April 22, 1952, Serial No. 283,693

4 Claims. (Cl. 60—39.71)

This invention relates to combustion apparatus, particularly to fuel vaporizing afterburner apparatus for augmenting the thrust of motive gases in an aviation jet propulsion power plant, and has for an object the provision of improved fuel vaporizing and distributing means for such an afterburner.

Another object of the invention is to provide an afterburner device adapted to effect evaporation and carburetion of fuel for promoting combustion in less space than that rejuired with a conventional fuel spray process.

It is a further object to provide an improved fuel vaporizing and flame holding apparatus for the afterburner of a jet engine.

Features of the invention are incorporated in improved afterburner apparatus comprising a plurality of fuel vaporizing units each having a fairing open to the stream of gases passing through the afterburner and encompassing a number of fuel evaporating surfaces, a fuel nozzle aligned therewith, and a backplate disposed downstream thereof and adjacent openings in the fairing, which are adapted to discharge the combustible mixture of fuel and turbine exhaust gases into the wake of the backplate. The apparatus constructed in accordance with the invention is adapted to effect evaporation and carburetion of the afterburner fuel in less space than that required for the conventional spray process. The improved apparatus thus affords a desirable flexibility in design, is readily adapted for operation with minimum combustion excited vibration, and renders feasible the use of a relatively short burner adapted to be interchangeably mounted on any of a number of aircraft engine models.

These and other objects are effected by the invention as will be apparent from the following description taken in connection with the accompanying drawing, forming a part of this application, in which:

Fig. 1 is a diagrammatic longitudinal view, partly sectioned along a line I—I of Fig. 2, showing an aviation gas turbine engine equipped with afterburner apparatus constructed in accordance with the invention;

Fig. 2 is an enlarged detail sectional view of the afterburner apparatus shown in Fig. 1 taken along the line II—II thereof;

Fig. 3 is an enlarged detail view of one of the vaporizing units shown in Fig. 2 taken along the line III—III thereof;

Fig. 4 is a sectional view taken along the line IV—IV of Fig. 3;

Fig. 5 is a sectional plan view of afterburner apparatus embodying the invention in a different form; and Fig. 6 is a fragmentary sectional view taken along the line VI—VI of Fig. 5.

Referring to Fig. 1 of the drawing, the power plant therein illustrated comprises a gas turbine engine 10 which is equipped with thrust augmenting or afterburner apparatus 11. The engine 10 may be of any suitable construction, and is diagrammatically shown as including a generally cylindrical casing structure 12 housing an axial-flow compressor 13, a turbine 14 drivingly connected thereto through the medium of an axial shaft 15, and annular combustion apparatus 16 which is interposed between the compressor and the turbine. An axial-flow annular communication 17 extends through the engine 10 from a frontal air inlet opening 18 to the discharge side of the turbine 14.

The afterburner 11 comprises a tubular envelope or casing 20, the forward end of which is suitably secured to the discharge end of the engine casing structure 12, and which has formed therein a combustion chamber 22 that communicates with the engine axial-flow passage 17 and with a rearwardly disposed discharge nozzle 23. Suitable apparatus 25 may be provided for controlling the flow area of the nozzle 23.

In operation of the power plant apparatus already described, air entering the inlet opening 18 is compressed by the compressor 13 and delivered by way of passage 17 to the combustion apparatus 16 for supporting combustion of fuel that is metered thereto by suitable means (not shown). The resultant heated gases are expanded through the turbine 14, which utilizes sufficient energy from the gases to drive the compressor. From the turbine discharge portion of passage 17 the gases and residual air are conducted through the afterburner 11, wherein additional fuel may be burned, in a manner hereinafter described, to augment the propulsive thrust of the gases at the nozzle 23.

Referring to Figs. 1 and 2, a plurality of vaporizer or burner units 30 are provided in the afterburner combustion chamber 22. A number of annular tubes, such as 31 and 32, and associated diametrically arranged tubes 33 and 34, are mounted in a common plane normal to the axis of the casing structure 20 for supporting the vaporizer units 30, which are spaced apart in concentrically arranged groups. The tubes 33 and 34 are connected to the rounded tubes 31 and 32, forming a network of communications to which afterburner fuel may be supplied by way of an extension 33a of the tube 33.

Each of the vaporizer units 30 comprises a substantially cylindrical fairing or shell 36 having a mixing chamber 37, the upstream end of which communicates through an opening 38 with the afterburner combustion chamber 22. The opposite end of the mixing chamber 37 is closed by a backplate or wall 36a of the shell 36, which has a number of lateral discharge ports 39 formed therein adjacent the wall. The fuel tubes 31 and 33 cross and are connected together within the mixing chamber 37, and carry at their intersection a fuel nozzle 40, preferably of the conventional type operative to effect a conical spray or dispersion of fuel particles. Mounted in the mixing chamber 37 intermediate the discharge end of the nozzle 40 and the ports 39 are a series of concentric cylindrical evaporating elements 41 of graduated sizes, the surfaces of which are adapted to receive fuel spray discharged by the nozzle 40. Radially disposed plates 42 are provided for supporting the evaporating elements 41 from the side wall of the shell 36.

In operation, hot air and gases exhausted from the turbine flow at high velocity through the afterburner combustion chamber 22, some of this air and gases being tapped off at the inlet openings 38 of the vaporizer units 30 for passage through the respective mixing chambers 37. Fuel is at the same time injected into the mixing chamber 37 of each vaporizer unit, and is spread out over the surfaces of the evaporating elements, thereby facilitating its vaporization and mixture with the air and gas stream scrubbing such surfaces. The rich mixture thus formed is discharged through the ports 39 into the main stream of air and gases in the afterburner combustion chamber, forming a combustible mixture, whereupon combustion takes place in the wake of the backplate or wall 36a of each unit. The plurality of units 30 thus further serve as flame holder means to ensure proper maintenance of the combustion reaction.

Referring to Figs. 5 and 6 of the drawing, annular afterburner fuel vaporizer means may be employed, if preferred, in the form of two or more annular cells such as those indicated at 45 and 46. The cell 45 is smaller in diameter than cell 46 and is spaced coaxially therein, both cells being carried coaxially within combustion chamber 22 by radially extending frame members 50, the outer ends of which are secured to the casing structure 20 of the afterburner 11.

As best shown in Fig. 6, the cells 45 and 46 are similar in construction, the first comprising outer and inner walls 52 and 53 enclosing an annular mixing chamber 54, and the other cell 46 encompassing the first and having outer and inner walls 55 and 56 forming an annular mixing chamber 57. The downstream ends of the mixing chambers 54 and 57 are closed by end walls 58 and 59, respectively, and communicate with the afterburner combustion chamber 22 by way of lateral outlet ports, such as those indicated at 60 and 61. Annular foraminous screens 63 and 64 are interposed in the respective mixing chambers 54 and 57, intermediate the ends of the cells 45 and 46. The upstream ends of the cells 45 and 46 have inlet openings 45a and 46a for receiving air and gases from the combustion chamber 22 of the afterburner apparatus. Fuel is introduced by way of a fuel supply pipe 65, which communicates with suitable annular apertured manifolds 66 and 67 that are carried within the respective mixing chambers 54 and 57.

In operation, fuel admitted from the usual source (not shown) to the pipe 65 flows through the apertures in manifolds 66 and 67 and is entrained in the streams of air and gas being forced through the mixing chambers 54 and 57. Larger particles of fuel may lodge momentarily on the screens 63 and 64, from which the fuel is quickly evaporated, the fuel vapor and air mixture being discharged laterally by way of the ports 60 and 61 into the combustion chamber 22. The downstream portions of the cells 45 and 46 serve to create local relatively stagnate zones in the gas stream, so as to effect holding of the flame in the desired portion of the afterburner combustion chamber 22.

From the foregoing description, it will be seen that improved afterburner fuel evaporator apparatus embodying a desired form of the invention may be utilized to augment or to replace the carburetion of fuel as normally effected in a conventional afterburner, in order to render the apparatus interchangeable and efficiently operative in various aircraft frames, and to afford design characteristics tending to minimize any development of combustion excited vibration.

While the invention has been shown in several forms, it will be obvious to those skilled in the art that it is not so limited, but is susceptible of various other changes and modification without departing from the spirit thereof.

What is claimed is:

1. In afterburner apparatus of the class described, a combustion chamber, a plurality of fuel vaporizing units therein each including a hollow fairing having a longitudinal axis parallel to the axis of the combustion chamber, each fairing having an upstream opening for receiving gases flowing in said cobustion chamber and a plurality of downstream outlets, a backplate closing each of said fairings adjacent said outlets therein, fuel emitting means mounted in each of said fairings, and evaporating surface means interposed between each of said fuel emitting means and said outlet.

2. In afterburner apparatus of the class described, a combustion chamber, a plurality of fuel vaporizing units therein each including a hollow fairing having a longitudinal axis parallel to the axis of the combustion chamber, each fairing having an upstream opening for receiving gases flowing in said combustion chamber and a plurality of downstream outlets, said outlets being formed in a lateral wall of each fairing with the flow axis of each opening disposed normal to the axis of the combustion chamber, fuel emitting means and evaporating surfaces disposed in said fairings, and a backplate closing the end of each of said fairings downstream of said openings, each of said fairings and backplates serving to create a wake where combustion of the mixture discharged from said outlets is initiated in the stream of gases in said combustion chamber.

3. In afterburner apparatus of the class described, a combustion chamber having a longitudinal gas flow axis, a plurality of fuel vaporizing units spaced apart in said combustion chamber in a plane normal to the axis thereof, fuel emitting means connected to each of said vaporizing units, each of said vaporizing units comprising a substantially cylindrical fairing forming a mixing chamber disposed parallel to the axis of said combustion chamber and having an entryway formed in the upstream end thereof, a wall closing the downstream end of said fairing, a plurality of lateral outlet openings formed in said fairing adjacent said wall for discharging a combustible mixture outwardly from said mixing chamber, and means constituting vaporizing surfaces disposed in said fairing in advance of said openings and downstream of the connection with said fuel emitting means.

4. In afterburner apparatus of the class described, a cylindrical combustion chamber, a plurality of annular fuel vaporizing units of different diameters and equal lengths spaced radially and arranged coaxially within said combustion chamber, each of said fuel vaporizing units comprising outer and inner walls forming an annular mixing chamber closed at the downstream end and having an annular upstream entryway directed into the path of gases flowing in said combustion chamber, said walls supporting interior fuel evaporating means and having lateral discharge outlets formed adjacent the downstream end of said unit, and fuel emitting means connected to said fuel vaporizing units, respectively.

References Cited in the file of this patent

UNITED STATES PATENTS

| 2,385,833 | Nahigyan | Oct. 2, 1945 |

FOREIGN PATENTS

| 981,045 | France | Jan. 10, 1951 |